United States Patent [19]
Khakoo

[11] Patent Number: 6,052,580
[45] Date of Patent: Apr. 18, 2000

[54] UPPER MEDIUM ACCESS CONTROL PROCESSOR ARCHITECTURE

[75] Inventor: Shabbir Amirali Khakoo, Edison, N.J.

[73] Assignee: Lucent Technologies Inc., Murray Hill, N.J.

[21] Appl. No.: 08/903,869

[22] Filed: Jul. 31, 1997

[51] Int. Cl.[7] ...................................................... H04J 3/16
[52] U.S. Cl. .......................... 455/418; 455/515; 455/422; 455/560; 455/466; 370/336; 370/329; 395/200.53; 395/200.54
[58] Field of Search ..................................... 455/466, 418, 455/514, 515, 70, 181.1, 186.1, 248.2, 420, 560; 370/336, 329; 395/200.53, 200.54, 736

[56] References Cited

U.S. PATENT DOCUMENTS

| | | | |
|---|---|---|---|
| 4,612,418 | 9/1986 | Takeda et al. | 370/336 |
| 5,729,540 | 3/1998 | Wegrzyn | 370/336 |
| 5,734,645 | 3/1998 | Raith et al. | 370/336 |
| 5,796,951 | 8/1998 | Hamner et al. | 395/200.53 |
| 5,842,138 | 11/1998 | Lu et al. | 455/560 |
| 5,842,210 | 11/1998 | Chen et al. | 455/418 |
| 5,875,343 | 2/1999 | Binford et al. | 395/736 |

*Primary Examiner*—Fan S. Tsang
*Assistant Examiner*—Simon Danh Nguyen
*Attorney, Agent, or Firm*—Gibbons, Del Deo, Dolan, Griffinger & Vecchione

[57] ABSTRACT

A upper medium access control processor is functionally defined by a set of tasks, where each task has a linked list queue for holding messages. Communications between tasks are achieved by placing the message onto the linked list queue of the desired task. The tasks are arranged into a plurality of prioritized groups for execution. The scheduler utilizes a N-phase scheme where tasks in a specific set of groups are executed at each phase. All tasks are guaranteed to run at least once during a complete cycle, thus preventing task starvation. The scheduler accommodates both synchronous and asynchronous tasks and still maintains the given priority scheme.

33 Claims, 8 Drawing Sheets

| TASK NAME | INITIAL TIMER LOAD VALUE | RELOAD VALUE |
|---|---|---|
| vTimerModule | 2 | 2 |
| vMaintenance | 3 | 4 |
| vMeasurement | 5 | 8 |
| vSanity | 9 | 8 |

UPPER MEDIUM ACCESS CONTROL PROCESSOR ARCHITECTURE

FIELD OF THE INVENTION

This invention relates to the field of telecommunications and in particular, to a processor architecture for providing multiple layer functionality in digital communications protocols.

BACKGROUND OF THE INVENTION

Within the last few years, more and more business people and private individuals are utilizing cordless technology to access their communication services. Digital European Cordless Telecommunications ("DECT") is a communications standard optimised for local coverage, that is, where user density and call traffic are quite high. The U.S. version of the DECT standard is called Wireless Customer-Premises Equipment ("WCPE"). Typical sites for such applications include office buildings with wireless Private Branch Exchanges ("PBXes"), residential areas, public access areas such as airports and campuses and radio in the local loop ("RLL"). The DECT standard supports various medium, including voice and data. In general, DECT uses a time-division multiple access/time-division duplex ("TDMA/TDD") scheme for communicating between a handset and a base station.

The standard defines four layers of interconnectivity, which correspond approximately to layers 1–3 of the International Standards Organization Open Systems Interconnection ("ISO/OSI") model. The first layer is the physical layer, which defines radio parameters such as frequency, timing and power values, and bit and slot synchronization. The medium access control ("MAC") layer controls the establishment and release of connections between portable and fixed parts of the system. The data link control layer provides reliable data links to the network layer, for signaling, speech transmission, and circuit and/or packet switched data transmission. The network layer is the main signaling layer and specifies message exchanges for establishment, maintenance, and release of calls between the portables and the fixed parts of the network. Systems which adhere to the above standard utilize multiple processors and firmware located in the fixed units, e.g., radio controllers, to implement the functionality described in one or more of the above layers along with attendant management functions.

One prior art scheme uses a relatively simple layer processor structure for implementing specific portions of the network and data link control layers. Although this structure supports some of the basic functionality, the addition of features such as maintenance, measurement, synchronization, and a full blown network layer will probably overwhelm its capabilities to serially execute all of the required tasks. In particular, the prior art utilizes a kernel program that is primarily a "return-to-top" type of a kernel, where all tasks in a given priority are executed in series. Tasks at lower priority are executed only if there are no higher priority tasks pending in the execution queue. Caution must be exercised when using such a kernel since a high priority task that runs often might "starve" lower priority tasks. The prior art firmware recognized this fact and countered by forcing a majority of all its tasks to exactly one priority. In this case, the prior art selected the lowest priority. While this prevents starvation of tasks, it adds a level of restriction that makes it difficult to implement a system that requires processing tasks at different priorities. For instance, repetitive tasks that need to run often to poll message buffers of different processors must now run at the lowest priority. As traffic density increases, these tasks could easily slow down to the point at which message overflows occur. Although this occurs with any non-preemptive kernel, forcing execution of the tasks to run in series increases the severity of the problem.

Another problem with this prior art scheme is that it "double" buffers messages received from the switch processing element ("SPE"). In other words, messages from the SPE are sent to a preliminary processor buffer. The messages are then removed from the preliminary processor buffer and placed into a smaller buffer for further processing. Until this message is fully processed, the layer processor is inhibited from retrieving any new messages from the SPE. At the same time, there is no limit to the speed at which the preliminary processor can accept messages from the SPE. As traffic density increases and tasks get more complicated, translating into longer completion times, this artificially inserted double buffering will easily cause the overflow of SPE messages.

Another disadvantage of the prior art firmware structure is that it assumes the existence of only network and data link control layers. Consequently, the method used for processing messages is relatively simple. The network layer is scheduled for all messages, since all messages are assumed to belong to the network layer. Once the network layer assumes control, it decides whether or not it can process the message. If it cannot, the message is passed on to other modules. With this scheme, all new tasks suffer the latency of defaulting the message to the network layer. A major drawback of this structure is that the addition of new features requires knowledge of where to place the appropriate code for jumping to the new modules.

Accordingly, there is a need to provide a processor structure and firmware, which maintains a given priority scheme, and determines message destination in a more direct and efficient manner, but remains flexible in the ability to add new features or modify existing features in view of the traffic density.

SUMMARY OF THE INVENTION

The present invention teaches a processor architecture for radio controllers which prevents starvation of lower priority tasks by scheduling periods of dedicated processor time to specified groups of tasks. The scheduler accommodates both synchronous and asynchronous tasks and maintains a given priority scheme. Importantly, the architecture of the present invention permits, with relative ease, the addition of new features and/or the modification of existing features.

In an exemplary embodiment of the present invention, tasks are arranged into a plurality of prioritized groups, where each task has an associated linked list for maintaining messages. The scheduler of the present architecture utilizes a N-phase scheme where tasks in a specific set of groups are executed at each phase. Importantly, all tasks are guaranteed to run at least once during a complete cycle, thus preventing task starvation. The present invention facilitates the coexistence of periodic and non-periodic tasks since periodic tasks are contained within the structure of the scheduler.

Advantageously, the structure and firmware of the present invention utilizes message handlers which retrieve, decode and place messages from the system and the wireless handset into the linked list queue of the respective tasks. In addition, all inter-task communications are achieved via the placement of messages onto the linked list queue of the desired task. The disposition of the messages into the linked lists permits the scheduler to execute the message handler routines as often as necessary, thus reducing the probability of message overflows. The above factors make the present invention an efficient and versatile architecture which is implementable with any wireless communications system.

BRIEF DESCRIPTION OF THE DRAWINGS

A more complete understanding of the present invention may be obtained from consideration of the following description in conjunction with the drawings in which.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 3, 4, 7 and 8A–8C may be provided by a single shared processor. (Use of the term "processor" should not be construed to refer exclusively to hardware capable of executing software.). Illustrative embodiments may comprise microprocessor hardware, read-only memory ("ROM") for storing software performing the operations discussed below, and random access memory ("RAM") for storing results.

Figure 1:
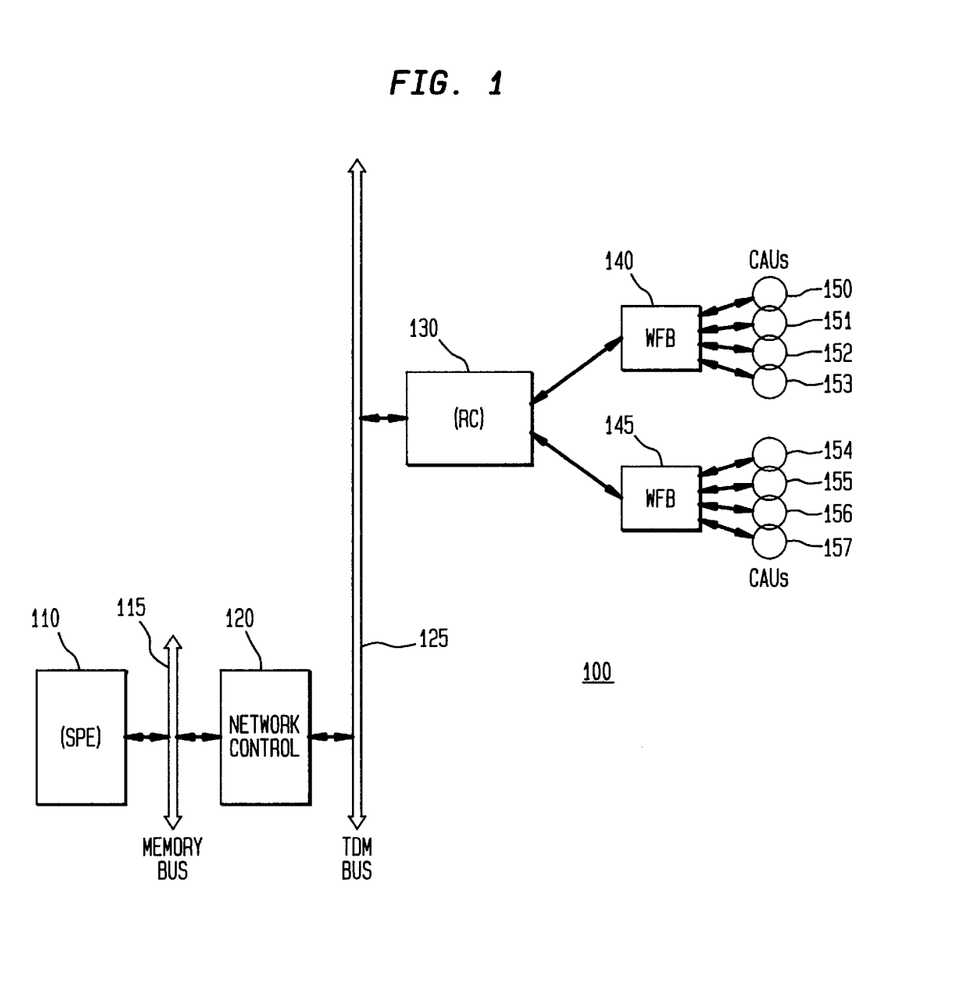
FIG. 1 is an exemplary embodiment of a wireless communications system which utilizes the architecture and method of the present invention.

Referring to FIG. 1, there is shown an exemplary embodiment of a wireless communications system ("WCS") 100, which utilizes a TDMA/TDD scheme for communicating between multiple users. WCS 100 includes a switch processing element ("SPE") 110 and a network controller 120, which exchanges messages utilizing a memory bus 115. Messages are then transmitted from the network controller 120 to a radio controller ("RC") 130, which then transmits the messages to a wireless handset through one of two associated wireless fixed bases ("WFB") 140 and 145. The WFBs 140 and 145 house the radio and antenna infrastructure to permit transmission and reception from the wireless handsets. Each WFB 140 and 145 provides four coverage area units 150–153 and 154–157, respectively. As such, each RC 130 has eight coverage area units, which is termed a cluster. In general, RC 130 provides voice service for up to 24 channels, i.e., 24 wireless calls are serviceable simultaneously, and provides the system with the ability to track traffic statistics, allows the wireless handset to setup calls, and permits mobility of the wireless handsets.

Figure 2:
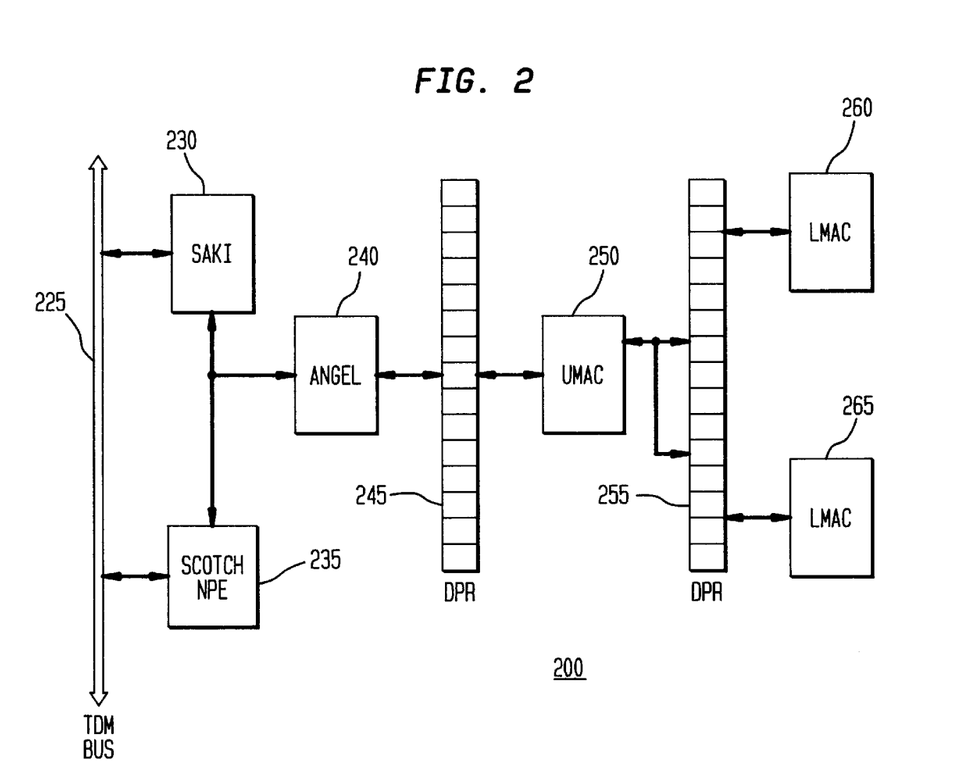
FIG. 2 is an exemplary embodiment of a radio controller in accordance with the present invention.

Referring now to FIG. 2, an exemplary high level block diagram is shown of a RC 200. RC 200 includes a data message processor 230 and a voice message processor 235, which transfers messages between a TDM Bus 225 and a message processor 240. Message processor 240 places the messages in a memory buffer, such as a dual ported RAM ("DPR") 245. Messages originating from a wireless handheld unit are processed by lower medium access control processors ("LMAC") 260 or 265, which then places the messages in a similar memory buffer 255. Selection of the proper LMAC is dependent upon which WFB the handheld unit is communicating with. Messages from both sides are then handled and processed by a upper medium access control processor ("UMAC") 250.

Figure 7:
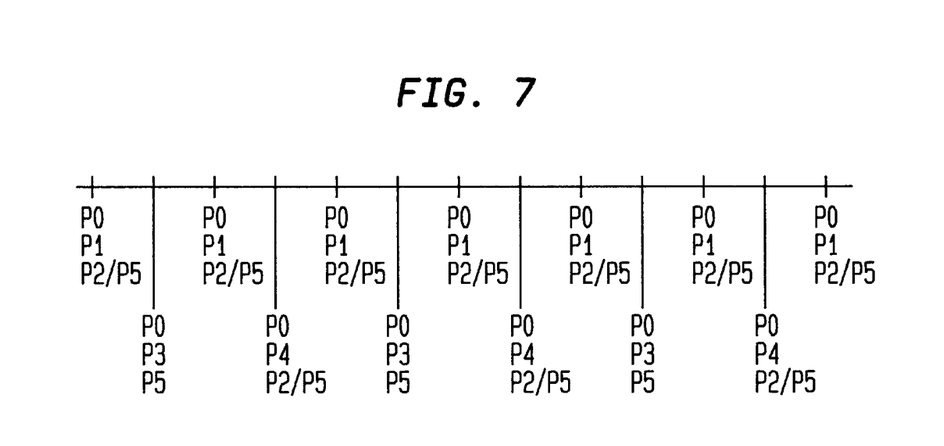
FIG. 7 illustrates an exemplary phase controller in accordance with the present invention.
Figure 8A:
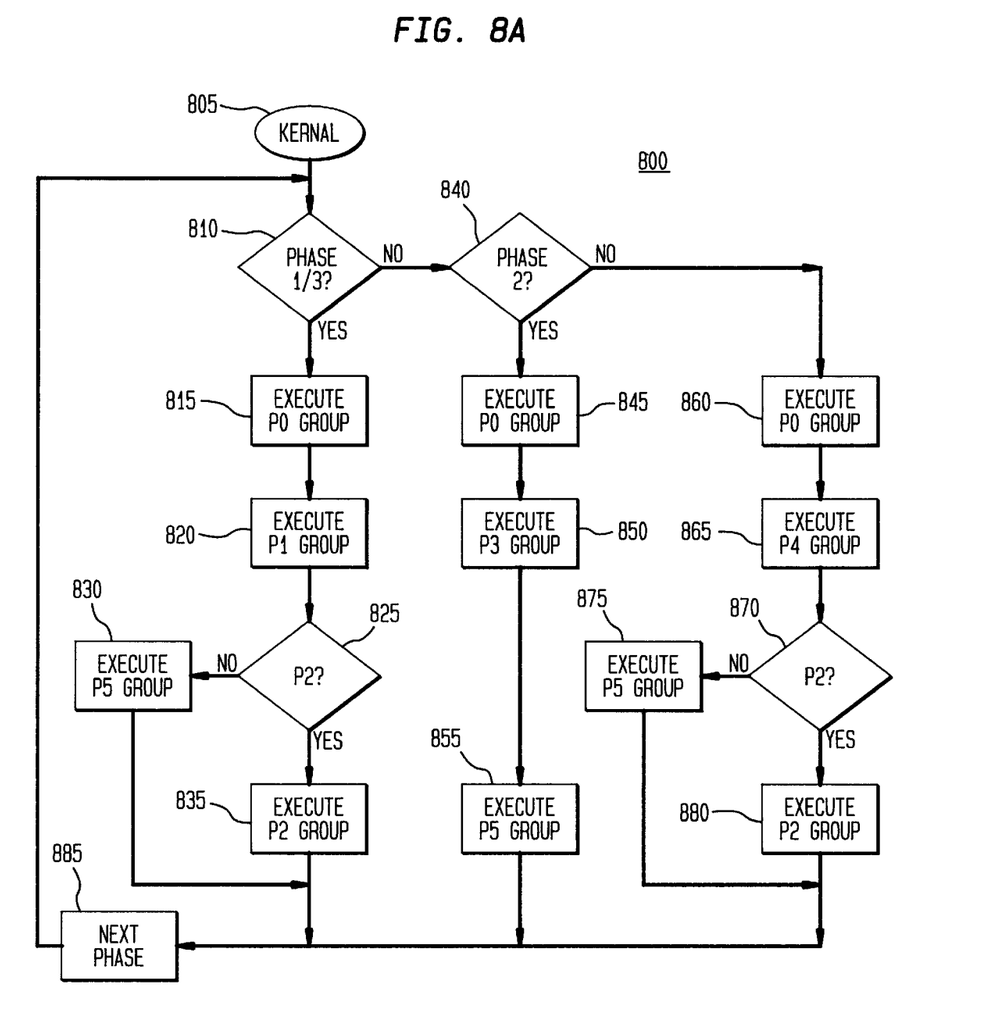
FIGS. 8A and 8B is a flowchart of the phase controller shown in FIG. 7 along with an exemplary embodiment of the groups.
Figure 8B:
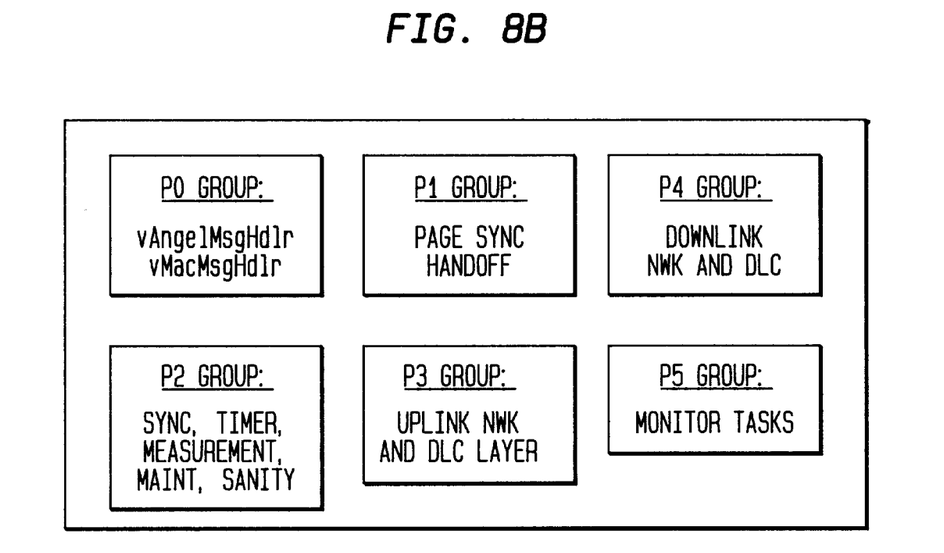

Referring to FIGS. 7 and 8A–8B, a non-preemptive, scheduler is presented which maintains the preconceived priority scheme and prevents the starvation of tasks. Furthermore, the scheduler handles all of the synchronous and asynchronous tasks performed in the system. However, the scheduler of the present invention is modifiable in view of new features or changes due to traffic conditions. In an exemplary embodiment, the scheduler is a "return-to-top" type of scheduler, such as the Symbionics Kernel, which is modified to facilitate the harmonious coexistence of all the synchronous and asynchronous tasks in the UMAC firmware. The kernel scheduler allows for multi-priority tasks to coexist without the possibility of starving a task. As shown in FIGS. 7 and 8A–8C, an example of an N-phase scheduler in accordance with the present invention is shown, where in this case N is set to 4. In phase 1, tasks in Group P0, P1 and P2 or P5 are executed (steps 810–820). As detailed below, tasks in Group P2 are periodic and are present only when a specified amount of time has elapsed (steps 825–835). In phase 2, tasks in Groups P0, P3 and P5 are executed (steps 740–855), and in phase 3, phase 1 is repeated (steps 810–835). In phase 4, tasks in Group P0, P4 and P2 or P5 are executed (steps 860–880).

In the phase controller method of the present invention, all priorities are maintained and the chances of sustained delay are minimized. In the scheme outlined, starvation is not possible since all tasks are guaranteed to run at least once. For instance, if the authentication algorithm in the downlink NWK layer takes a long time, the scheduler ensures that Group P0 will assume control 4 more times before another authentication algorithm is executed. That is, the scheduler is a non-preemptive scheduler and will re-schedule the Group until the task is complete. Moreover, the scheduler is flexible in that addition or deletion of a phase is relatively simple. For instance, should phase 3 be unnecessary, the "next" phase controller, which is implementable as a simple array priority mask, is alterable to eliminate phase 3 totally.

As shown below, the system implements an uplink and downlink path for the Network and Data Link Control functions. In the initial implementation, the uplink and downlink paths of the system are allocated the same amount of CPU time, in spite of their priorities. In this case, it is assumed that the traffic on a link will be symmetrical. However, if this is not true, another phase is inserted where the one path of the protocol is executed "x" times before the other path is executed.

Figure 3:
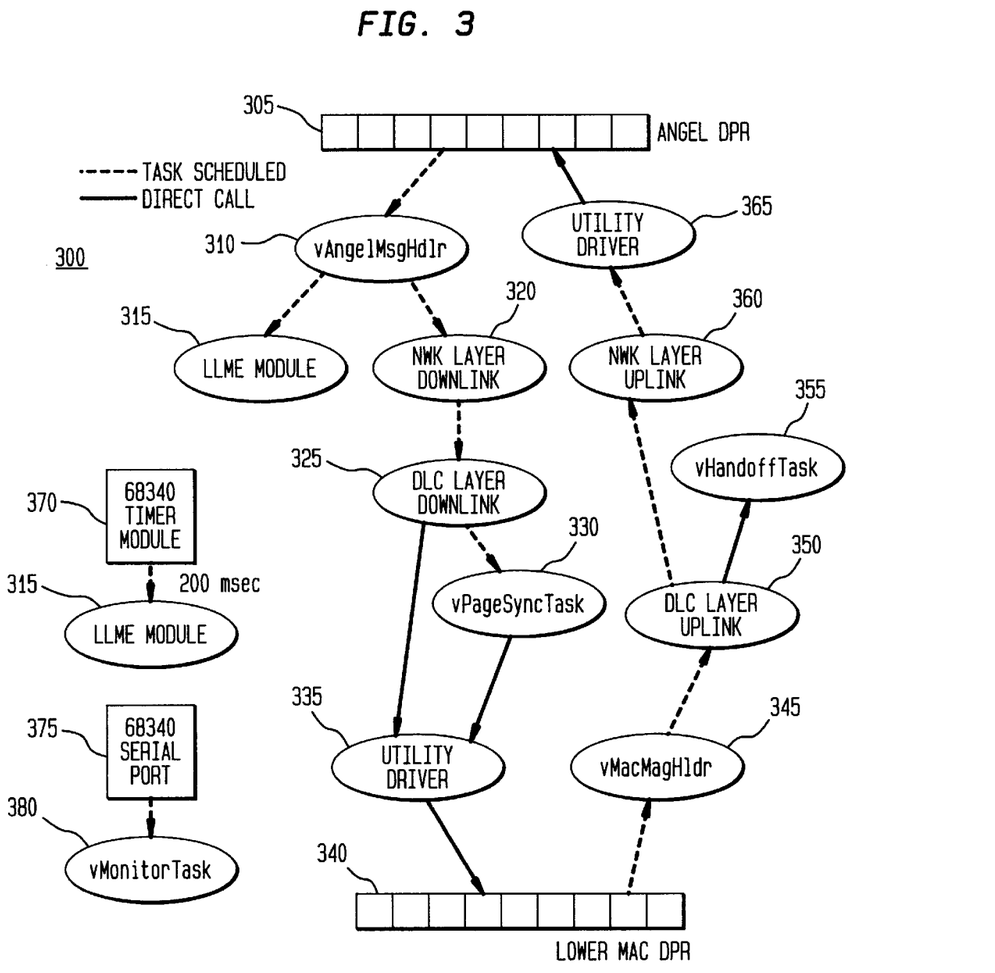
FIG. 3 is a functional flowchart of the task inter-relationship process in accordance with the architecture of the present invention.

Referring to FIG. 3, a high level inter-relationship of the various tasks that constitute the firmware architecture of UMAC 250 is depicted. In an exemplary embodiment of UMAC 250, there are essentially five groups of tasks on the RC circuit pack. Specifically, Group P0 includes vAngelMsgHdlr 310 and vMacMsgHdlr 345, Group P1 includes vPageSyncTask 330 and vHandoffTask 355, Group P2 is represented by LLME module 315, which includes the five periodic tasks, Group P3 includes Network Layer Uplink 360 and Data Link Control Layer Uplink 350, Group P4 includes Network Layer Downlink 320 and Data Link Control Layer Downlink 325, and Group P5 includes vMonitorTask 380. All tasks utilize a modified Symbionics Kernel interface, and communicate via a standard buffer structure, such as the KNLMSG structure supplied by the Symbionics Kernel interface. In addition to the modifications made to the Symbionics Kernel system to support the present invention scheduler, the KNLMSG structure is also modified to permit tasks to schedule other tasks. By communicating via the modified KNLMSG structures, it is evident that a specific task cannot communicate directly with another task. Inter-task communication is message based and as shown below, the kernel determines the appropriate time for any task to run. Each task has a linked listed queue of messages. That is, each task has an associated buffer chain, which is comprised of KNLMSGs or other similar memory structures. The tasks will service one message from the linked list per execution entry, and will service the messages in a FIFO ("First In, First Out") format. That is, once the task is allowed to run, it will fetch messages from the buffer chain. For example, if there is a need for task A to communicate with task B, task A deposits a message into task B's buffer chain. When the operating system, i.e., the kernel, determines that it is time to run task B, then task B fetches the message from its buffer chain and processes it appropriately.

In accordance with the above concept that tasks are scheduled, and as indicated by the dashed lines in FIG. 3, the system retrieves a message from the SPE and from the LMAC in a tasked manner. That is, direct communication is not permitted between tasks. In contrast, message transmission to both these entities are direct writes, as indicated by the solid lines, into the their respective buffers. Specifically, in the downlink direction from the SPE, the top level routine vAngelMsgHdlr 310 will decode the message from dual port RAM ("DPR") 305 and place the message into a queue for the appropriate task, e.g., 315 or 320. In the uplink direction to the SPE, the top level routine vMacMsgHdlr 345 performs similarly to vAngelMsgHdlr 310. Direct writes into DPR 305 and 340 are performed by utility drivers 335 and 365, respectively. Although not a complete list, an exemplary set of tasks along with their linked list nomenclature is shown in Table 1. Specifically, the table summarizes the names of each linked list that is written into by vAngelMsgHdlr 310 and vMacMsgHdlr 345.

TABLE 1

Task Linked List

| Task Name | Head of List | Tail of List |
| --- | --- | --- |
| vMaintenance | psMaintListHead | psMaintListTail |
| vMeasurement | psMeasureListHead | psMeasureListTail |
| vUplinkNwk | psUpNwkListHead | psUpNwkListTail |
| vDownlinkNwk | psDownNwkListHead | psDownNwkListTail |
| vUplinkDlc | psUpDlcListHead | psUpDlcListTail |
| vDownlinkDlc | psDownDlcHead | psDownDlcListTail |

Referring back to FIG. 3, all tasks execute whenever CPU time is dedicated to them, except for the low level management entity ("LLME") 315 tasks. LLME 315 consists of periodic tasks that are scheduled to execute at a fixed rate. All LLME 315 tasks own a flag that is set once the task has been scheduled to run and reset upon exit out of the task. The usage of this flag is explained in more detail below. vMonitorTask 380 handles the command debugging interface via a serial port 375.

As stated above, the present invention utilizes a prioritized group structure, where each group contains a specific set of tasks. In the exemplary embodiment of UMAC 250, the groups mentioned above are prioritized with Group P0 being the highest priority and Group P5 being the lowest. The groups and their individual tasks are detailed below:

Group P0

This group contains the message handlers, vAngelMsgHdlr and vMacMsgHdlr, which individually poll the two message buffers from the SPE and from the LMAC, respectively. This group is considered the most real time critical, since execution delays may lead to message(s) getting lost. Both these tasks decode the messages received and place the messages in the linked listed queue of the respective task. By allowing message queuing per task, the message handler routines are executable as often as necessary, thus reducing the possibility of message overflows. Initially, the message handler routines will retrieve exactly two messages out of the respective buffers per entry. However, due to the flexible architecture of the firmware, the number of messages retrieved per entry is extendable to any specified level in response to message overflows.

Group P1

This group is made up of two tasks, the vPageSyncTask and the vHandOffTask. The first task, vPageSyncTask is required for synchronization of all paging messages in a given cluster. As stated previously, each RC contains two WFBs and each WFB contains up to 4 coverage area units ("CAUs"). Thus the coverage area provided by a single RC is 8 CAUs and is termed a cluster. A wireless handset is registered to a single RC. To deliver an incoming call, a handset is first paged. However, because a handset is not required to be in a certain WFBs range and since there are two WFBs per cluster, a page must be sent out from both WFBs. To avoid delays between the two pages transmitted by the different WFBs, the pages are synchronized so that a handset does not receive the same page at two different times. In other words, it is required that the same paging message be transmitted on the same frame on both WFBs connected to an RC.

The second task in this group is vHandOffTask, which will service under the DLC layer and will complete the inter-WFB handover of duplex connections. A data structure or routing table for holding active bearer information in one place is required to permit proper handling of a handover request. Additionally, this table describes the characteristics of the active bearer, which is extremely useful during debugging. An exemplary table contains the following items and is indexed by, for example, a MAC Connection Endpoint Identifier ("MCEI"), which has a range from 0 through 23, one for each serviceable connection. The MCEI is supplied to the DLC layer via a MAC connection indication message from the LMAC, such as a MC-SAP. The table contains a Portable MAC Identifier ("PMID"), which is supplied to the DLC via a MC-SAP from the LMAC; a Wireless Fixed Base Number ("WFB No."), which is supplied to the DLC from vMacMsgHdlr; a Data Link Endpoint Identifier ("DLEI"), which is assigned by the DLC; and a B Field Buffer Number, which is assigned by the NWK layer. The MCEI, PMID, WFN No., and the DLEI are entered into the table by the DLC layer and the B Field Buffer Number is entered into the table by the NWK layer. Both of the Group P1 tasks are self contained, and their priority is set sufficiently high to guarantee that handovers are completed as fast as possible and that pages suffer minimum delay.

Figure 4A:
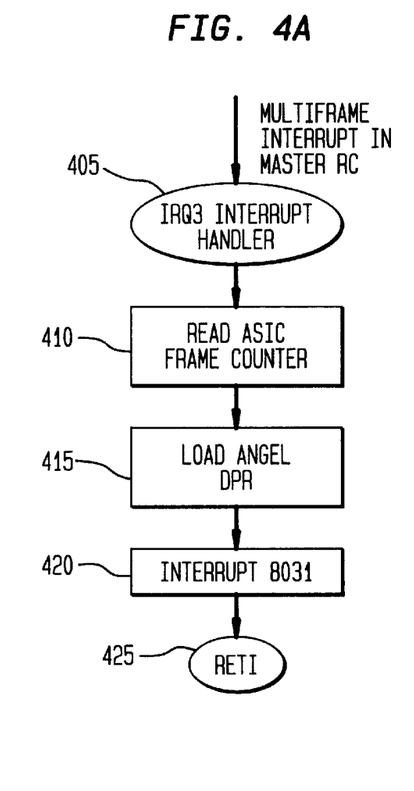
FIGS. 4A, 4B and 4C are flowcharts illustrating an exemplary synchronization method in accordance with the present method.
Figure 4B:
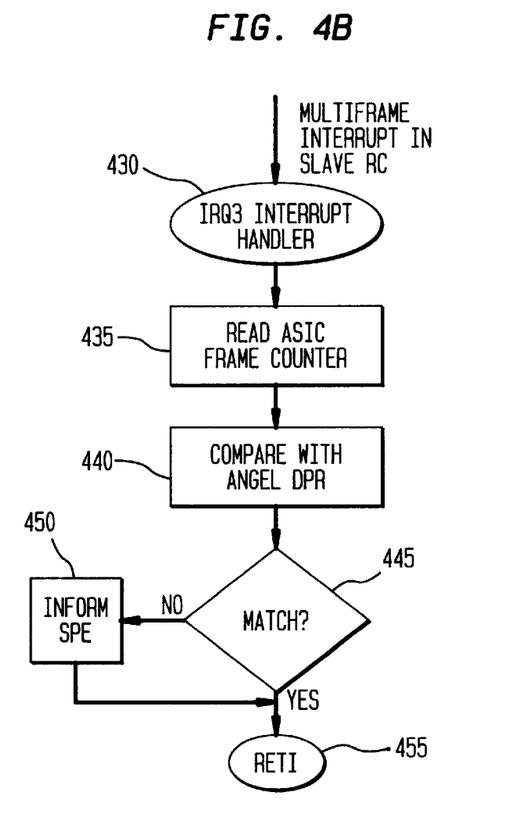
Figure 4C:
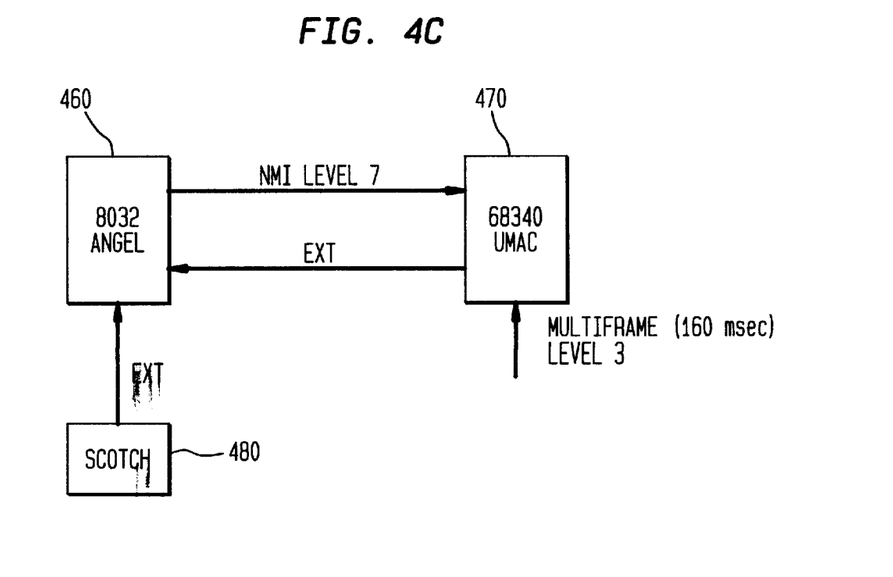

Although the RC circuit pack synchronization is not a task contained within the Group structure, it is presented here for purposes of clarity and completeness. The synchronization of the circuit pack is required to facilitate handover of duplex connections from one RC to another. Synchronization includes the need to configure the circuit pack as master/slave and the transmission/reception to/from other circuit packs of the multiframe number when encryption is supported. One exemplary implementation of this feature takes advantage of the existing hardware interrupt on the circuit pack and is illustrated in FIGS. 4A, 4B and 4C. In the master mode, the RC is required to transmit a 28-bit frame counter number to all other slave RC's in the system, e.g., a private branch exchange. This frame counter is readily available by reading the specific Application Specific Integrated Circuit ("ASIC") device. The UMAC firmware services the level 3 "MULTIFRAME" interrupt, which is an external interrupt occurring once every 160 milliseconds. This interrupt synchronizes the firmware to the hardware. The interrupt handler will read the frame counter from the ASIC (step 410), load it into the message processor 460 (termed the "Angel" processor) DPR "Synchronization Block" (step 415), and interrupt the Angel 460 (step 420), which will then transmit the contents out of the FIFO in the voice message processor 480, which in is this example is a SCOTCH NPE device. In the slave mode, the UMAC firmware 470 will service the level 7 "NMI" interrupt from Angel 460 once Angel 460 has transferred the received information from SCOTCH NPE 480 FIFO and into Angel's 460 DPR "Synchronization Block" (steps 430–435). This interrupt service routine will compare received information with the frame counter read out of ASIC (steps 440–445). Any mismatch will be swiftly reported to the switch processing element ("SPE") (step 450).

Group P2

Figure 5A:
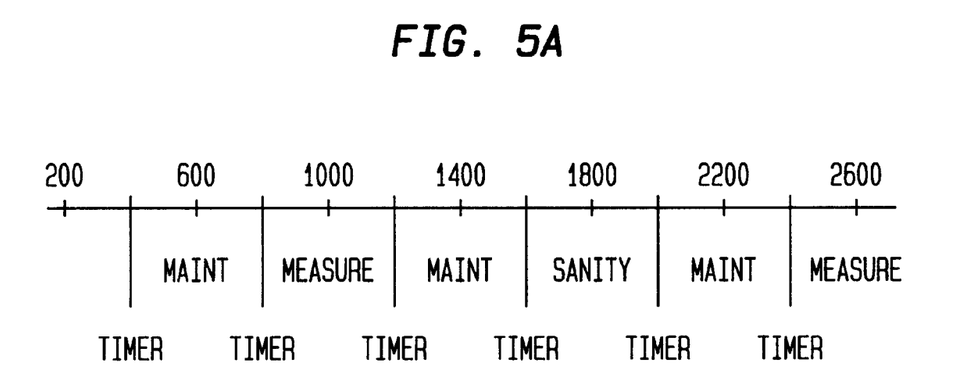
FIGS. 5A and 5B illustrate exemplary task scheduling rules for tasks scheduled on a periodic basis.
Figure 5B:
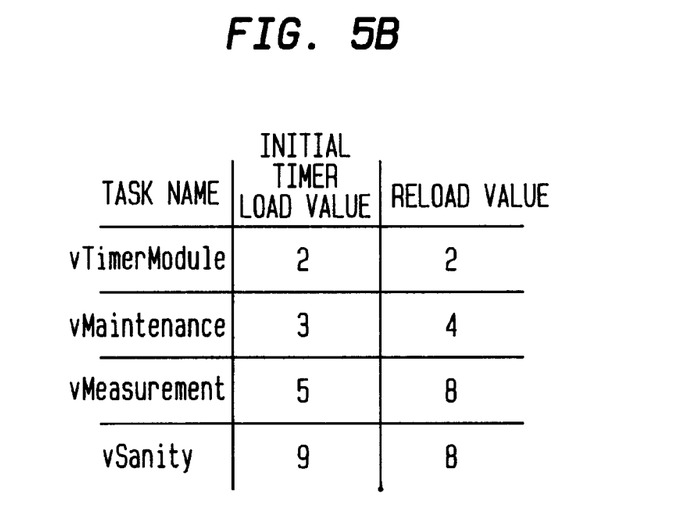

This group consists of the periodic tasks that are performed by the UMAC processor, each of which has a period equal to a multiple of 200 milliseconds. In an exemplary embodiment, the tasks in this group include vMaintenance, vMeasurement, vTimerModule and vProcessorSanity. This group is controlled by a timer, for example, one of the two timers in the 68340 microprocessor. This timer is initialized to provide a level 2 hardware interrupt, which is below the level of external interrupts. FIGS. 5A and 5B provide an overview of how these periodic tasks are scheduled. As illustrated, a stagger mechanism is implemented to distribute and therefore minimize the execution time of this group. For example, the vTimerModule is initially set at 2 with a reload value of 2. This means that this task is initially executed at 400 milliseconds (200 milliseconds×2) and then again at 800 milliseconds (400 milliseconds+(2×200 milliseconds)). In general, the interrupt handler operates as follows. The interrupt handler sets the "schedule" flag of a task once it schedules a task. A task is scheduled only if this flag is not set. This flow control mechanism controls, in a straightforward manner, the number of tasks that are placed in the kernel execution queue. Note that this group of tasks are non-critical and therefore, this flow control scheme is sufficient so long as the kernel resources are not exhausted. A separate counter is kept that indicates the blocking condition of exhausted kernel resources.

As stated above, the tasks in this group include vMaintenance, vMeasurement, vTimerModule and vProcessorSanity, each of which is further explained below.

All of the maintenance functions on the RC circuit are handled by vMaintenance, which is scheduled once every 800 milliseconds. Maintenance actions not only include demand tests from the SPE, but also covers communications with the SPE about in-line errors, test results from the LMAC and responses to various queries from the SPE. When scheduled, the vMaintenance processes up to two messages from its linked list of messages. The execution times of these tasks are between 150 to 200 microseconds. In addition, the vMaintenance module services some of the MAC connection indication messages, such as the servicing of the ME-SAP, which was previously performed in the DLC layer.

The vMeasurement task handles and computes the various traffic statistics such as call length times, average hold time and slot occupancy. Additionally it keeps track of the number of handovers, radio frequency usage and other such factors. The vMeasurement task works closely with a similar task in the LMAC processor. Specifically, the vMeasurement task acts as the data processor, while the corresponding task in the LMAC acts as the data collector. In an exemplary embodiment, the vMeasurement is executed once every 1600 milliseconds.

The vTimerModule supports protocol level timeouts, such as the retransmission of DLC packets, etc. In an exemplary embodiment, this module is executed once every 400 milliseconds, thus providing accuracy of the timeouts to within 400 milliseconds. Instead of polling a hardware timer for a timeout as in the prior art, this module decrements one tick in every timer in the linked list of active timers whenever it is executed.

Finally the vProcessorSanity, which is required for monitoring inter-processor sanity, is executed once every 1600 milliseconds. The sanity check ensures the proper functioning of the processors on the RC circuit pack. In a multiprocessor circuit pack like the radio controller, one processor is dedicated as the master and the others as slaves. The master and slave processors negotiate a rate whereby the slave will periodically inform the master that everything is okay. This is called a sanity check. If the slave fails to inform the master, then the slave processor is reset and an error is logged. When this happens it usually means that either there is a bug in the software or that the hardware is broken. This is similar to when a PC application hangs and a command-alternate-delete sequence is executed to reset the PC. The UMAC processor expects that the LMAC processor will have updated its sanity location in the LMAC DPR by the time it is executed. In an exemplary embodiment, a threshold of two missed handshakes is implemented such that if the LMAC does not update the sanity location within two seconds, it will be held reset and the SPE will be appropriately informed.

Group P3 and Group P4

These two groups contain the network ("NWK") and data link control ("DLC") layers of the DECT or other such protocol. Each layer contains a linked list or a buffer chain, which holds messages that need to be processed when the layer is given an opportunity to execute. The layers have been purposely divided into uplink and downlink paths to facilitate the possibility of handling more traffic in one direction than the other direction. That is, each layer will have two linked lists of messages per task. For example, with reference to FIGS. 3 and 6, in the NWK layer, one linked list will queue those messages received from the Angel to the NWK layer, while the other will queue those message received from the DLC to the NWK layer. The uplink and downlink paths of the NWK contain two utility routines that retrieve messages from these linked lists. In the uplink path, the uplink utility will retrieve messages from the uplink linked list and call the appropriate entity of the NWK layer state machine. Likewise, in the downlink direction the downlink utility will retrieve messages in the downlink linked list and pass it to the appropriate NWK layer state machine. The same applies to the DLC layer, which will now house two queues, one for messages from the NWK layer in the downlink direction and one from vMacMsgHdlr in the uplink direction.

As stated previously, the queue is nothing other than a KNLMSGs. In order to facilitate the uplink/downlink notation on servicing messages, the simple queuing of messages provided by the kernel cannot be used since it implements a FIFO scheme. For instance, assume there are three messages for the NWK layer in the queue, of which two were placed consecutively by vAngelMsgHldr and the third by the DLC layer. Using the existing kernel message queuing scheme will result in the downlink running twice before the uplink half gets a chance. As a consequence, uplink and downlink paths are required for proper message handling.

Figure 6:
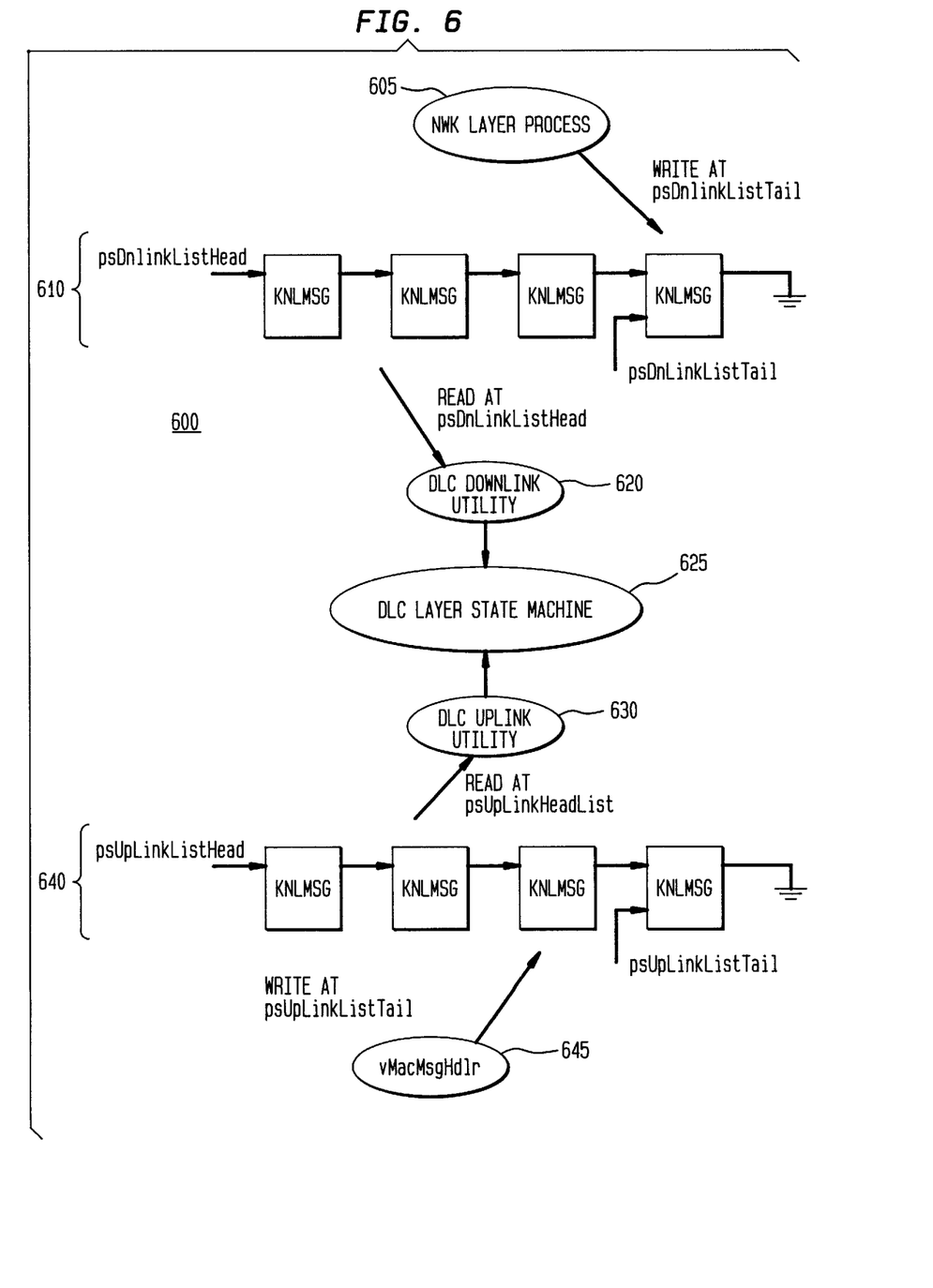
FIG. 6 is a functional flowchart of a task link list in accordance with the present invention.

Referring to FIG. 6, an example is shown of the linked list owned by the DLC layer 600, depicting the processes that have write permission and those that have read permission in this queue. Specifically, there is shown an example of a DLC task and the messages that can be given it. A uplink portion of the DLC is shown from the wireless handset to the RC (625–645) and a downlink portion is shown from the RC to the wireless handset (605–625). When the kernel operating system determines that it is time to schedule the vMacMsgHdlr task 645, then the vMacMsgHdlr task 645 deposits messages into the uplink buffer chain 640. Likewise, when the kernel operating system determines it is time to schedule the NWK layer task 605, then the messages are deposited into the downlink buffer chain 610. Moreover, when the operating system decides to run the DLC task, then the DLC task will fetch a message from each of the buffer chains utilizing DLC uplink 630 and DLC downlink 620, and process the messages accordingly 625.

As shown above, NWK and DLC layers each have uplink and downlink paths, which utilize utility functions for retrieving messages from a specific linked list and passes it to the respective state machines. Similar to the other tasks, a layer cannot be called directly by any module and must be scheduled by the kernel.

Group P5

This group houses all of the tasks that pertain to supporting the command and debugging interface and in addition, it houses the vMonitorTask and vPrintTask tasks. It has the lowest priority of all the tasks in the UMAC firmware structure. In addition, a single debug mechanism needs is adopted, which enables the printing of all messages received by a task. This mechanism permits the checking of task interface requirements.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A wireless communications system which provides message and task handling between the system and a wireless handset, said system comprising:

an upper medium access control processor;

said upper medium access control processor functionality defined by a plurality of tasks;

said upper medium access control processor having a plurality of groups, each of said plurality of groups including a portion of said plurality of tasks; and a scheduler having N phases, wherein a portion of said plurality of groups are executed at one of said N phases and wherein at least one task of each of said plurality of groups is executed at each cycle of said scheduler.

2. The wireless communications system according to claim 1, wherein said plurality of groups is prioritized.

3. The wireless communications system according to claim 2, wherein said plurality of tasks include periodic and non-periodic tasks.

4. The wireless communications system according to claim 1, wherein each of said plurality of tasks has a linked list queue for holding messages, wherein each of said plurality of tasks communicates with another task by placing a message in said linked list queue of said another task.

5. The wireless communications system according to claim 1, wherein one of said plurality of tasks is a network layer functionality.

6. The wireless communications system according to claim 5, wherein said network layer functionality includes a utility driver for retrieving messages and passing said messages onto said network layer functionality state machine.

7. The wireless communications system according to claim 1, wherein one of said plurality of tasks is a data link control layer functionality.

8. The wireless communications system according to claim 7, wherein said network layer functionality includes a utility driver for retrieving messages and passing said messages onto said network layer functionality state machine.

9. The wireless communications system according to claim 1, wherein said plurality of tasks includes periodic tasks which execute at multiples of a given time interval.

10. A radio controller for providing message and task handling between a communications system and a wireless handset, said controller comprising:

an upper medium access control processor having a plurality of tasks which define a functionality of said upper medium access control processor;

said upper medium access control processor further having a plurality of groups, each of said plurality of groups including a portion of said plurality of tasks; and a phase controller having N phases, wherein a portion of said plurality of groups are executed at one of said N phases and wherein at least one task of each of said plurality of groups is executed at each cycle of said phase controller.

11. The radio controller according to claim 10, wherein:

said plurality of groups is prioritized; and said plurality of tasks include synchronous and asynchronous tasks.

12. The radio controller according to claim 10, wherein said plurality of tasks includes a network layer functionality and a data link control layer functionality.

13. The radio controller according to claim 12, wherein said network layer functionality and said data link layer functionality each includes a utility driver for retrieving messages and passing said messages onto a specific state machine.

14. A processor for a radio controller, said processor comprising:

an upper medium access control processor performing a plurality of tasks which define a functionality of said upper medium access control processor;

said upper medium access control processor including a plurality of groups, each of said plurality of groups including a portion of said plurality of tasks; and a scheduler having N phases, wherein a portion of said plurality of groups are executed at one of said N phases and wherein at least one task of each of said plurality of groups is executed at each cycle of said scheduler.

15. The processor according to claim 14, wherein:

said plurality of groups is prioritized; and said plurality of tasks include asynchronous and synchronous tasks.

16. The processor according to claim 14, wherein said plurality of tasks includes a network layer functionality and a data link control layer functionality, each functionality including a utility driver for retrieving messages and passing said messages onto a specific state machine.

17. A method for preventing starvation of tasks by guaranteeing execution of said tasks within a cycle of a scheduler, said method comprising:

defining a plurality of tasks as the functionality being executed by a upper medium access control processor;

defining a plurality of groups, each of said plurality of groups including a portion of said plurality of tasks; and scheduling a portion of said plurality of groups to be executed at one of said N phases wherein at least one task of each of said plurality of groups is executed at each cycle of said scheduler.

18. The method according to claim 17, wherein said plurality of groups is prioritized and said plurality of tasks include periodic and non-periodic tasks.

19. The method according to claim 17, wherein said plurality of tasks includes periodic tasks which execute at multiples of a given time interval.

20. The method according to claim 17, further including the step of establishing for each of said plurality of tasks a linked list queue for holding messages, wherein each of said plurality of tasks communicates with another task by placing a message in said linked list queue of said another task.

21. A wireless communications system which provides message and task handling between the system and a wireless handset, said system comprising:

an upper medium access control processor;

said upper medium access control processor functionality defined by a plurality of tasks;

said upper medium access control processor having a plurality of groups, each of said plurality of groups including a portion of said plurality of tasks; and a scheduler having N phases, wherein a portion of said plurality of groups are executed at one of said N phases;

wherein said plurality of tasks includes:

a first uplink path for a network layer function;

a second uplink path for a data link control layer function;

a first downlink path for a network layer function; and a second downlink path for a data link control layer function.

22. The wireless communications system according to claim 21, wherein said first and second uplink path and said first and second downlink path are in one of said plurality of groups.

23. The wireless communications system according to claim 21, wherein said first and second uplink path are in one group of said plurality of groups and said first and second downlink path are in another group of said plurality of groups, wherein said one group and said another group are of different priorities.

24. A wireless communications system which provides message and task handling between the system and a wireless handset, said system comprising:

an upper medium access control processor;

said upper medium access control processor functionality defined by a plurality of tasks;

said upper medium access control processor having a plurality of groups, each of said plurality of groups including a portion of said plurality of tasks; and a scheduler having N phases, wherein a portion of said plurality of groups are executed at one of said N phases and wherein said scheduler has 4 phases.

25. A wireless communications system which provides message and task handling between the system and a wireless handset, said system comprising:

an upper medium access control processor;

said upper medium access control processor functionality defined by a plurality of tasks;

said upper medium access control processor having a plurality of groups, each of said plurality of groups including a portion of said plurality of tasks; and a scheduler having N phases, wherein a portion of said plurality of groups are executed at one of said N phases and wherein said plurality of tasks includes periodic tasks which execute at multiples of a given time interval and wherein said given time interval is 200 milliseconds.

26. A radio controller for providing message and task handling between a communications system and a wireless handset, said controller comprising:

an upper medium access control processor having a plurality of tasks which define a functionality of said upper medium access control processor;

said upper medium access control processor further having a plurality of groups, each of said plurality of groups including a portion of said plurality of tasks; and a phase controller having N phases, wherein a portion of said plurality of groups are executed at one of said N phases; and wherein said plurality of tasks includes:

a first uplink path for a network layer function;

a second uplink path for a data link control layer function;

a first downlink path for a network layer function; and a second downlink path for a data link control layer function.

27. The radio controller according to claim 26, wherein said first and second uplink path are in one group of said plurality of groups and said first and second downlink path are in another group of said plurality of groups, wherein said one group and said another group are of different priorities.

28. A radio controller for providing message and task handling between a communications system and a wireless handset, said controller comprising:

an upper medium access control processor having a plurality of tasks which define a functionality of said upper medium access control processor;

said upper medium access control processor further having a plurality of groups, each of said plurality of groups including a portion of said plurality of tasks; and a phase controller having N phases, wherein a portion of said plurality of groups are executed at one of said N phases;

wherein:

said phase controller has 4 phases; and said plurality of tasks includes periodic tasks which execute at multiples of a given time interval, wherein each of said plurality of tasks having a linked list queue for holding messages, wherein each of said plurality of tasks communicates with another task by placing a message in said linked list queue of said another task.

29. A processor for a radio controller, said processor comprising:

an upper medium access control processor performing a plurality of tasks which define a functionality of said upper medium access control processor;

said upper medium access control processor including a plurality of groups, each of said plurality of groups including a portion of said plurality of tasks; and a scheduler having N phases, wherein a portion of said plurality of groups are executed at one of said N phases;

wherein said plurality of tasks includes:

a uplink path for each of a network layer function and a data link control layer function; and a downlink path for each of said network layer function and said data link control layer function.

30. A processor for a radio controller, said processor comprising:

an upper medium access control processor performing a plurality of tasks which define a functionality of said upper medium access control processor;

said upper medium access control processor including a plurality of groups, each of said plurality of groups including a portion of said plurality of task; and scheduler having N phases, wherein a portion of said plurality of groups are executed at one of said N phases;

wherein each uplink path is in a first group and each downlink path is in a second group, wherein said first group and said second group have different priorities.

31. A processor for a radio controller, said processor comprising:

an upper medium access control processor performing a plurality of tasks which define a functionality of said upper medium access control processor;

said upper medium access control processor including a plurality of groups, each of said plurality of groups including a portion of said plurality of tasks; and a scheduler having N phases, wherein a portion of said plurality of groups are executed at one of said N phases;

wherein:

said scheduler has 4 phases; and said plurality of tasks includes periodic tasks which execute at multiples of a given time interval.

32. A method for preventing starvation of tasks by guaranteeing execution of said tasks within a given interval, said method comprising:

defining a plurality of tasks as the functionality being executed by a upper medium access control processor;

defining a plurality of groups, each of said plurality of groups including a portion of said plurality of tasks; and scheduling a portion of said plurality of groups to be executed at one of said N phases wherein said plurality of tasks includes:

a first uplink path for a network layer function;

a second uplink path for a data link control layer function;

a first downlink path for a network layer function; and a second downlink path for a data link control layer function.

33. The method according to claim 32, wherein said first and second uplink path are in one group of said plurality of groups and said first and second downlink path are in another group of said plurality of groups, wherein said one group and said another group are of different priorities.

* * * * *